United States Patent Office 3,296,324
Patented Jan. 3, 1967

3,296,324
DEHYDROCYCLODIMERIZATION OF LOW MOLECULAR WEIGHT PARAFFINS
Sigmund M. Csicsery, Greenbrae, Calif., assignor to Chevron Research Company, San Francisco, Calif., a corporation of Delaware
No Drawing. Filed Apr. 5, 1966, Ser. No. 540,187
8 Claims. (Cl. 260—673)

This application is a continuation-in-part of copending application Serial No. 218,099, filed August 20, 1962.

This invention relates to the conversion of paraffin hydrocarbons, and, more particularly, to the dehydrocyclodimerization of low molecular weight paraffins to produce higher molecular weight aromatic hydrocarbons.

The present invention is directed to a process for producing aromatic hydrocarbons and hydrogen, and comprises contacting at least one paraffin hydrocarbon containing 3 to 5 carbon atoms per molecule with a catalyst comprising at least one member selected from the group consisting of Group VIII metals and compounds thereof, disposed on a solid, alumina-containing support at a temperature of from about 800° to 1200° F. and a pressure of from about 2 to 1500 p.s.i.a. The acidity of the alumina containing support must be such that the Acidity Index (to be defined below) of the entire catalyst is between 0 and 9.

It has been found that if the described reaction conditions and catalysts are employed in the subject process, the specified $C_3$ to $C_5$ paraffins will be converted to substantial yields of hydrogen and aromatic hydrocarbons containing more carbon atoms than that of any hydrocarbon component of the paraffin feed. It is apparent that this result is quite different from the well-known dehydrocyclization reaction wherein higher boiling paraffins, e.g., heptane and octane, are converted to cyclic compounds containing the same number or less carbon atoms in the molecule than those in the feed. Thus, the present reaction can be termed "dehydrocyclodimerization" to distinguish it from conventional dehydrocyclization.

As noted, paraffins containing 3 to 5 carbon atoms per molecule are converted to aromatics by the present process. Thus, propane, normal butane, isobutane, normal pentane and the isomeric pentanes, or mixtures thereof, can be employed. It is preferred to use the butanes as the feed to the process.

Suitable catalysts for the reaction comprise Group VIII metals disposed on a solid, alumina-containing support. Of these metals, the noble metals are preferred. Still more preferred are platinum and/or palladium. Generally, the total amount of Group VIII metals on the catalyst should be in excess of 0.3 weight percent (as the metal) of the entire catalyst. The amount preferably lies in the range of from about 0.5 to 10.0 weight percent, and even more preferably, from about 0.6 to 3.0 weight percent.

The catalyst support can be alumina alone, as long as the acidity index of the entire catalyst is between 0 and 9. Alumina is generally considered to possess intrinsic acidity. However, incorporation onto the alumina of small amounts of basic components, such as alkali metals, is effective in poisoning the acidity. For example, it can be shown (see Pines, H. and Haag, W., J. Am. Chem. Soc., 82, 2471 (1960)) that less than about 1.0 weight percent sodium is effective in completely neutralizing all the acidic sites on an alumina catalyst. Therefore, alumina containing alkali metals in significant amounts, as for example, greater than 1.0 percent by weight, will not possess sufficient acidity to give the overall catalyst composition an acidity index between 0 and 9.

Preferably, additional acidity is imparted to the support, and, hence, to the catalyst. This can be accomplished in a number of ways. For example, an alumina containing catalyst can be increased in acidity by the inclusion of halogens in the catalysts such as chlorides and/or fluorides. Furthermore, the catalyst can be increased in acidity by employing a support comprising both alumina and silica. Acid-activated clays and synthetic metal aluminum silicates (including synthetic zeolitic aluminosilicates normally referred to as "molecular sieves") can also be employed with alumina as the catalyst support.

For purposes of this invention, it is necessary that the catalyst have an acidity index less than 9. The acidity index is determined as follows. A sample of catalyst is placed in a reactor at 1040° F. and either normal butane or isobutane at atmospheric pressure and a liquid hourly space velocity (LHSV) of 1 volume of feed per volume of catalyst is contacted with the catalyst. A sample of the product is withdrawn after 10 minutes have elapsed from the start of the run, and the butenes in the product are measured. The mole ratio of isobutene to normal butenes is then determined. Depending on the feed used, the acidity index is defined and determined as:

(1) Using a normal butane feed $$\left(\frac{\text{moles normal butene}}{\text{moles isobutene}}\right) - \frac{1}{0.79} = \text{acidity index}$$

(2) Using an isobutane feed $$\left(\frac{\text{moles isobutene}}{\text{moles normal butene}}\right) - 0.79 = \text{acidity index}$$

The value, 0.79, is the equilibrium ratio of isobutene to normal butenes in the butane conversion reaction, based on the data of F. D. Rossini et al., "Selected Values of Physical and Thermodynamic Properties of Hydrocarbons and Related Compounds, American Petroleum Institute Research Project 44," Carnegie Press, Pittsburgh, Pennsylvania (1953).

The acidity index is in terms of an "approach to equilibrium" between isobutene and the normal butenes. The more acidic the catalyst, the closer the mole ratio of isobutene to normal butenes in the products will approach the equilibrium value. Consequently, the more acidic the catalyst, the smaller its acidity index will be, and in general the greater the conversion of the feed comprising low molecular weight paraffins to higher molecular weight aromatic hydrocarbons will be. It is preferred to use a catalyst which has an acidity index below 5.0, and more preferably below 3.0. All of the catalysts discussed in this specification as being useful for purposes of the present invention have acidity indices within the preferred range.

The present process is conducted at temperatures in the range of from about 800° to 1200° F., and preferably from about 950° to 1100° F. Pressures may be subatmospheric, atmospheric or superatmospheric and will fall in the range of from about 2 to 1500 p.s.i.a. The paraffin feed can be introduced to the reaction zone at a liquid hourly space velocity (LHSV) of from about 0.1 to 30 or even higher, as either a liquid, vapor, or in a mixed liquid-vapor phase. The reaction itself is conducted in the vapor phase. Hydrogen can be passed along with the feed into the reactor, but it is preferred that the mole ratio of hydrogen added to the reactor (other than that produced in the reaction) to the paraffin hydrocarbon feed is less than 1.0, and more preferably is less than 2 moles of hydrogen to 3 moles of hydrocarbon. It has been found that higher aromatic yields result when essentially no hydrogen (other than that produced in the reaction) is added. Because of the rather large production of hydrogen, it may be desirable to pass an inert gas such as helium or nitrogen into the reaction zone along with the paraffins so as to reduce the hydrogen partial pressure within the reaction zone. Also, hydrogen sulfide or compounds capable of forming hydrogen sulfide within the reactor (as by decomposition) can often be advantageously employed as a feed component so as to reduce catalyst fouling due to coke formation.

*Example 1.*—A number of experimental runs were made on the conversion of essentially pure isobutane to produce aromatic hydrocarbons utilizing a number of catalysts and varying reaction conditions. This feed was selected to emphatically show the nature of the dehydrocyclodimerization reaction and the high yields obtainable with the particular catalysts.

A number of different catalysts, all of which comprised platinum metal disposed on alumina supports, were employed in these runs. In addition, these catalysts contained halides. Table I summarizes the platinum and halide content of the catalysts used.

TABLE I

| Catalyst | Weight Percent of Total Catalyst | | |
|---|---|---|---|
| | Platinum | Chloride | Fluoride |
| A | 0.75 | 0.35 | 0.35 |
| B | 0.75 | 0.77 | None |
| C | 0.8 | 0.83 | None |
| D | 0.9 | 0.09 | None |
| E | 2.4 | 1.08 | None |

The results of the runs, along with the reaction conditions, are shown in Table II. No hydrogen was added to the reactor in the course of the runs, except where noted.

In the Table II summarized runs, large amounts of hydrogen were produced. For example, in Run No. 7, about 0.9 mole of hydrogen were formed per mole of feed. The amount of hydrogen produced in the other experiments varied due to the differences in overall conversion and product distribution.

From the data presented in Table II, a number of observations can be made.

With respect to temperature, it can be seen that particularly high yields were obtainable at reaction temperatures in the 1000° to 1100° F. range. A comparison of runs 3 and 4 shows that, under essentially the same conditions and with the same catalyst, adding substantial amounts of hydrogen to the feed was operable, but not particularly desirable. Runs 7 to 11, conducted at the same temperature and pressure but with four different catalysts, show that very high yields were attained by using the catalysts having increased acidity as a result of halide addition. Run 12, conducted under the same conditions as Runs 7 to 11, did not have such high yields, due to the fact that Catalyst D did not have additional acidity imparted to it by significant halide addition (Catalyst D contained only 0.09 percent chloride).

*Example 2.*—A number of experimental runs were made in which isobutane feed was contacted with a number of different catalysts, all of which comprised platinum metal disposed on alumina supports. These catalysts contained various amounts of chlorides except for the catalyst used in Run 15 which also contained fluoride. The conversion of isobutane to produce aromatic hydrocarbons utilizing each of the various catalysts was performed under contions of temperature, pressure and space velocity such that the acidity index of each catalyst could be determined. The reaction conditions were a temperature of 1040° F., a pressure of 14.7 p.s.i.a. and a liquid hourly space velocity of 1.0  No hydrogen was added to the reactor during the course of the run.

Table III presents the results of the runs as well as the compositions of the catalyst.

It is noted that the acidity indices of the catalysts used in this example all lie within the preferred limits. The

TABLE II

| Run No. | 1 | 2 | 3 | 4 | 5 | 6 | 7 | 8 | 9 | 10 | 11 | 12 |
|---|---|---|---|---|---|---|---|---|---|---|---|---|
| Catalyst | E | E | E | E | E | E | E | E | A | B | C | D |
| Temperature, °F | 900 | 1,110 | 997 | 980 | 1,000 | 1,100 | 1,040 | 1,040 | 1,040 | 1,040 | 1,040 | 1,040 |
| Pressure, p.s.i.a | 14.7 | 14.7 | 115 | 115 | 1,215 | 234 | 14.7 | 14.7 | 14.7 | 14.7 | 14.7 | 14.7 |
| Hydrogen/Hydrocarbon Mol Ratio | | | 0.63 | | | 0.55 | | | | | | |
| Helium/Hydrocarbon Mol Ratio | | | | | | | | | | | | |
| LHSV | 2.5 | 2.54 | 6.84 | 6.84 | 1.0 | 8.0 | 2.5 | 2.6 | 1.05 | 1.03 | 2.64 | 2.4 |
| Hydrocarbon Products, wt. percent of total: | | | | | | | | | | | | |
| Unreacted Isobutane | 51.2 | 48.30 | 36.30 | 47.00 | 16.60 | 24.50 | 17.02 | 22.60 | 23.10 | 10.50 | 40.00 | 33.70 |
| Methane | 1.0 | 4.05 | 5.52 | 1.20 | 6.83 | 10.40 | 5.74 | 3.52 | 9.20 | 7.16 | 7.55 | 5.27 |
| C₂ Hydrocarbons | 0.5 | 3.10 | 2.12 | 1.40 | 18.80 | 8.50 | 2.98 | 3.30 | 7.72 | 7.46 | 4.56 | 2.40 |
| C₃ Hydrocarbons | 2.4 | 2.90 | 13.40 | 3.85 | 28.90 | 16.00 | 12.00 | 10.00 | 12.80 | 14.70 | 7.73 | 9.23 |
| n-Butane | 21.0 | 2.90 | 37.10 | 32.60 | 10.00 | 29.00 | 16.02 | 15.80 | 9.00 | 14.25 | 7.40 | 7.40 |
| Isobutene | 14.0 | 10.60 | 1.93 | 5.00 | 1.70 | 1.54 | 12.40 | 11.90 | 8.60 | 8.08 | 6.14 | 28.30 |
| n-Butenes and Butadiene | 5.7 | 14.20 | 1.57 | 3.70 | 1.24 | 0.65 | 14.18 | 13.81 | 9.31 | 11.46 | 7.40 | 8.98 |
| C₅-C₆ Aliphatics | 1.0 | 0.36 | 0.51 | 1.29 | 8.81 | 0.22 | 0.46 | 0.42 | 0.37 | 0.25 | 8.97 | 0.28 |
| Benzene | 0.1 | 2.08 | 0.11 | 0.37 | 1.74 | 0.75 | 1.33 | 1.40 | 2.44 | 2.40 | 0.25 | 0.50 |
| Toluene | 0.7 | 3.15 | 0.57 | 1.39 | 3.10 | 2.03 | 4.38 | 3.88 | 5.18 | 6.40 | 2.22 | 1.00 |
| C₈ Aromatics | 2.0 | 4.79 | 0.87 | 2.20 | 2.28 | 3.36 | 12.71 | 11.45 | 9.16 | 15.00 | 4.75 | 2.67 |
| C₉-C₁₀ Aromatics | 0.4 | 0.25 | | | | 0.46 | 0.78 | 1.92 | 3.12 | 2.34 | 7.87 | 0.27 |
| Coke (if included in analysis) | | 3.32 | | | | 2.59 | | | | | 2.56 | |
| Total Aromatics, wt. percent of Isobutane converted to gas and liquid products | 6.5 | 19.9 | 2.4 | 7.4 | 8.6 | 8.7 | 23.1 | 24.1 | 25.9 | 29.2 | 29.0 | 6.7 |

TABLE III

| Run No. | 13 | 14 | 15 | 16 | 17 | 18 | 19 | 20 | 21 | 22 |
|---|---|---|---|---|---|---|---|---|---|---|
| Catalyst: | | | | | | | | | | |
| Platinum content, wt. percent | 0.8 | 0.315 | 0.75 | 0.75 | 0.74 | 0.86 | 0.66 | 0.5 | 0.9 | 0.8 |
| Chloride content, wt. percent | 0.83 | 0.49 | 0.35<br>0.35F | 0.77 | 0.54 | 0.02 | 0.64 | 0.5 | 0.81 | 0.61 |
| Reaction Results: | | | | | | | | | | |
| Unreacted feed, wt. percent | 24.4 | 43.6 | 30 | 15.3 | 6.7 | 17.3 | 10 | 17.9 | 5.8 | 18.7 |
| Total aromatics, wt. percent | 24.9 | 15.7 | 17 | 21.0 | 34 | 21.4 | 22 | 22.7 | 24.6 | 10.7 |
| Isobutene/normal butenes mole ratio | 0.81 | 0.85 | 1.0 | 0.78 | 0.74 | 1.23 | 0.81 | 0.85 | 0.9 | 1.7 |
| Acidity index | 0.02 | 0.06 | 0.21 | 0 | 0 | 0.44 | 0.02 | 0.06 | 0.11 | 0.91 | catalysts used in Runs 16 and 17 show acidity indices of 0. Straightforward computation of the acidity indices would have given negative numbers for these two catalysts but since it is theoretically impossible for the isobutene/ normal butenes molar ratio to go below the equilibrium value when using isobutane feed, the acidity indices are shown as 0.

*Example 3.*—A series of experimental runs were made in which isobutane was contacted with various catalysts, all of which comprised platinum metal disposed on alumina supports. In addition, two of the catalysts contained small amounts of potassium. The reaction conditions were controlled in order to measure the acidity indices of the catalysts; that is, a temperature of 1040° F., a pressure of 14.7 p.s.i.a., and an LHSV of 1.0 were used. No hydrogen was added to the reactor during the runs. Table IV summarizes the compositions of the catalysts used and the results of the runs.

Using a normal butane feed, the acidity indices of the catalysts are well within the preferred limits for purposes of this invention.

*Example 5.*—Four additional catalysts, all employing Group VIII metals disposed on commercial alumina supports were prepared and used as catalysts in the dehydrocyclodimerization reaction of the present invention. A normal butane feed was contacted with the catalysts. Two of the runs (Runs 34 and 35) were conducted under reaction conditions such that the acidity indices could be determined. The other two runs (Runs 32 and 33, were conducted at pressures (22.5 p.s.i.a. and 21.6 p.s.i.a., respectively) greater than those used when determining acidity indices; hence the acidity indices were not determined. No hydrogen was added to the reactor during the runs. The compositions of the catalysts as well as the results of the runs are presented in Table VI.

TABLE IV

| Run No. | 23 | 24 | 25 | 26 | 27 |
| --- | --- | --- | --- | --- | --- |
| Catalyst: | | | | | |
| Platinum Content, Wt. Percent | 0.8 | 0.5 | 0.58 | 0.98 | 0.90 |
| Chloride Content, Wt. Percent | 0 | 0 | 0 | 0 | 1.03 |
| Potassium Content, Wt. Percent | 0 | 0 | 0 | 3.78 | 3.78 |
| Reaction Results: | | | | | |
| Unreacted Feed, Wt. Percent | 18.4 | 43.5 | 18.6 | 72.4 | 93.6 |
| Total Aromatics, Wt. Percent | 15.5 | 12.0 | 19.2 | 0.9 | 0.13 |
| Isobutene/Normal Butenes Mole Ratio | 2.3 | 1.64 | 1.5 | 38 | 26 |
| Acidity Index | 1.51 | 0.85 | 0.71 | 37.2 | 25.2 |

The catalysts containing platinum metal on alumina supports and having no chloride or potassium present (Runs 23, 24 and 25) display acidity indices well within the preferred range of 0 to 3. The catalysts containing platinum and potassium on alumina supports (Runs 26 and 27) display acidity indices well above the limits required as part of this invention. Note, too, the low aromatic yields which resulted in Runs 26 and 27. The small amount of added potassium effectively neutralized the acidity of the alumina supports and made the catalysts unacceptable for dehydrocyclodimerization of low molecular weight paraffins to produce higher molecular weight aromatic hydrocarbons. Even the addition of chloride to a catalyst containing potassium (Run 27) was ineffective in restoring the acidity necessary for purposes of this invention.

*Example 4.*—Using normal butane as a feed, a number of experimental runs were made using catalysts containing platinum and chloride on alumina supports. Again the reaction conditions were maintained such that the acidity indices could be determined. The temperature was maintained at 1040° F., the pressure at 14.7 p.s.i.a., and the LHSV set at 1.0. No hydrogen was added to the reactor. The results of the runs and the compositions of the catalysts as well as the acidity indices are tabulated in Table V.

TABLE V

| Run No. | 28 | 29 | 30 | 31 |
| --- | --- | --- | --- | --- |
| Catalyst: | | | | |
| Platinum Content, Wt. Percent | 0.75 | 0.8 | 0.74 | 0.8 |
| Chloride Content, Wt. Percent | 0.77 | 0.83 | 1.96 | 0.09 |
| Reaction Results: | | | | |
| Unreacted Feed, Wt. Percent | 19.5 | 10.8 | 27.5 | 21.4 |
| Total Aromatics, Wt. Percent | 14.8 | 17.6 | 4.8 | 4.3 |
| Isobutene/Normal Butenes Mole Ratio | 0.64 | 0.7 | 0.57 | 0.33 |
| Acidity Index | 0.29 | 0.16 | 0.48 | 1.76 |

TABLE VI

| Run No. | 32 | 33 | 34 | 35 |
| --- | --- | --- | --- | --- |
| Catalyst: | | | | |
| Metal Content, Wt. Percent | [1] 0.2 | [2] 1.0 | [3] 1.0 | [4] 0.8 |
| Chloride Content, Wt. Percent | None | [5] 1.0 | None | None |
| Products, Wt. Percent of Total: | | | | |
| Unreacted n-Butane | 46.6 | 50.9 | 57.8 | 78.1 |
| Methane | 5.2 | 5.5 | 5.2 | 2.4 |
| $C_2$ Hydrocarbons | 6.7 | 8.9 | 5.0 | 4.0 |
| Propane | 4.8 | 4.7 | 1.9 | 0.6 |
| Isobutane and Propylene | 6.9 | 6.8 | 5.1 | 5.4 |
| Isobutene | 4.1 | 2.7 | 2.1 | 1.3 |
| n-Butenes and Butadiene | 9.2 | 4.6 | 4.0 | 2.2 |
| $C_5$–$C_8$ Aliphatics | 0.6 | 0.5 | 0.2 | 0.2 |
| Benzene | 1.8 | 2.0 | 1.9 | 0.5 |
| Toluene | 2.3 | 3.8 | 2.7 | 1.0 |
| $C_8$ Aromatics | 2.4 | 3.9 | 3.0 | 1.0 |
| $C_9$–$C_{10}$ Aromatics | 0.2 | 0.3 | 1.5 | 1.0 |
| Coke | 7.7 | 4.4 | 8.1 | 1.9 |
| Hydrogen | 1.5 | 1.0 | 1.5 | 0.4 |
| Total Aromatics, Wt. Percent of n-Butane converted to gas and liquid products | 12.5 | 20.4 | 21.6 | 16.0 |
| Isobutene/Normal Butenes Mole Ratio | .45 | .59 | .53 | .59 |
| Acidity Index | | | 0.62 | 0.42 |

[1] Rhodium.    [2] Palladium.    [3] Nickel.
[4] Ruthenium.    [5] Fluoride.

The above data show that the catalysts comprising Group VIII metals on alumina supports are entirely satisfactory for purposes of this invention. The acidity indices all lie within the preferred range. Furthermore, the catalysts possess the appropriate acidity indices without additives (e.g., fluorides) incorporated onto the alumina supports to impart additional acidity to the catalysts.

In addition to the above experimental runs, aromatics have been successfully produced from isobutane by employing a catalyst containing 1.7 percent (weight) palladium, about 27.5 percent silica and about 70.8 percent alumina. Likewise, a catalyst containing 1.7 percent (by weight) platinum, about 27.5 percent silica and about 70.8 percent alumina has been found to be suitable for use in the present process.

During the reaction, some carbonaceous deposits (coke) are formed on the catalyst. The coke can be removed by conventional methods, thereby regenerating the catalyst for reuse. A plethora of patents (among them being U.S. Patents 2,641,582 and 2,664,404) describe various techniques for regenerating platinum and palladium catalysts. Generally, regeneration involves contacting the coked catalyst with dilute, oxygen-containing gases at temperatures sufficiently high (700° to 1100° F.) to burn off the coke without damaging the catalyst surface area by sintering. Regeneration of a catalyst of the present invention has been done by contacting the catalyst (for example, Catalyst E, Example 1, described above) with an air-nitrogen mixture containing one to two percent oxygen at a temperature within the range of 700° to 900° F. These operations restored the catalyst to its original activity.

The present process can be conducted in either fixed catalyst bed, moving bed or fluid catalyst systems. Because of the coke laydown on the catalyst and the desirability of regenerating the catalyst, it is preferred to employ contacting systems wherein regeneration can be accomplished without discontinuing the flow of feed to the reaction zone or zones. This can be done in several ways. One method involves the use of a swing reactor. Such a unit comprises a plurality of fixed bed reaction zones with line manifolding so as to allow the feed to be passed into a first zone and when the catalyst in that zone is deactivated by coke, to shift the feed to a second freshly regenerated reaction zone. After shifting the feed to the second reactor, the deactivated catalyst in the first zone is regenerated and ready for use when the second reactor is deactivated.

Another preferred contacting system is one involving a fluid catalyst system. In this operation, finely divided solid (fluid) catalysts are continuously recycled between a reaction zone and a separate regeneration zone. In each zone, the catalyst is maintained in a fluidized state that behaves much like a liquid. In the reactor, the feed is continuously contacted with freshly regenerated catalyst and the hydrocarbon products are removed from the reactor. The coked catalyst is continuously removed from the reactor and passed into the regenerator wherein it is contacted with an oxygen-containing gas to burn the coke and regenerate the catalyst. The regenerated catalyst is then returned to the reaction zone.

Whether employing a fixed, moving or fluid catalyst bed system, the hydrogen and hydrocarbons produced in the reaction zone are removed and recovered in any suitable manner, as by absorption and/or distillation. The actual separation of the various products can be done to suit the needs of the particular operator. Preferably, the $C_3$ to $C_5$ hydrocarbons recovered from the reaction zone are recycled thereto.

I claim:

1. A process for converting low molecular weight paraffins to higher molecular weight aromatic hydrocarbons and hydrogen, which comprises contacting in a reaction zone at least one paraffin hydrocarbon containing from 3 to 5 carbon atoms per molecule with a catalyst comprising at least one Group VIII metal disposed on a solid, alumina-containing support, said alumina support being of sufficient acidity that the acidity index of the catalyst is between 0 and 9, at a temperature in the range of from about 800 to 1200° F., and at a pressure in the range of from about 2 to 1500 p.s.i.a., said contacting being done such that the mole ratio of hydrogen added to said reactor (other than that produced in the reaction) to said paraffin hydrocarbon is less than 1.0.

2. The process of claim 1, wherein the acidity index of the catalyst is between 0 and 5.

3. The process of claim 1, wherein the mole ratio of hydrogen added to the reactor to paraffin hydrocarbon is less than 2 moles of hydrogen to 3 moles of hydrocarbon.

4. The process of claim 1, wherein the temperature is in the range of from about 950 to 1100° F.

5. The process of claim 1, wherein the paraffin hydrocarbon is contacted with the catalyst at a liquid hourly space velocity in the range of from about 0.1 to 3.0.

6. The process of claim 1 wherein the Group VIII metal is platinum.

7. The process of claim 1 wherein the Group VIII metal is palladium.

8. A process for converting low molecular weight paraffins to higher molecular weight aromatic hydrocarbons and hydrogen, which comprises continuously contacting at least one paraffin hydrocarbon containing from 3 to 5 carbon atoms per molecule in a reaction zone with a fluidized catalyst comprising at least one Group VIII metal disposed on a solid, alumina-containing support, said alumina support being of sufficient acidity that the acidity index of the catalyst is between 0 and 9, at a temperature in the range of from about 800 to 1200° F., and at a pressure in the range of from about 2 to 1500 p.s.i.a., said contacting being done such that the mole ratio of hydrogen added to said paraffin hydrocarbon is less than 1.0, continuously recovering hydrogen and aromatic hydrocarbons from said reaction zone, continuously withdrawing coke-containing catalyst from said reaction zone and regenerating said coke-containing catalyst in a regeneration zone by contact with an oxygen-containing gas at an elevated temperature, and continuously returning regenerated catalyst from said regeneration zone to said reaction zone.

References Cited by the Applicant

UNITED STATES PATENTS

| | | |
|---|---|---|
| 2,900,427 | 8/1959 | Viles. |
| 2,992,283 | 7/1961 | Eng. |
| 3,000,809 | 9/1961 | Ridgeway et al. |
| 3,046,317 | 7/1962 | Myers. |
| 3,126,426 | 3/1964 | Turnquest et al. |

ALPHONSO D. SULLIVAN, *Primary Examiner.*